US009669789B2

United States Patent
Fujiwara

(10) Patent No.: US 9,669,789 B2
(45) Date of Patent: Jun. 6, 2017

(54) SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/742,016

(22) Filed: Jun. 17, 2015

(65) Prior Publication Data
US 2015/0367804 A1 Dec. 24, 2015

(30) Foreign Application Priority Data

Jun. 23, 2014 (JP) ................................ 2014-128633

(51) Int. Cl.
*B60R 21/207* (2006.01)
*B60R 21/231* (2011.01)
*B60R 21/233* (2006.01)
*B60R 21/2338* (2011.01)

(52) U.S. Cl.
CPC ........ *B60R 21/207* (2013.01); *B60R 21/2338* (2013.01); *B60R 21/23138* (2013.01); *B60R 2021/23146* (2013.01); *B60R 2021/23161* (2013.01); *B60R 2021/23382* (2013.01); *B60R 2021/23386* (2013.01); *B60R 2021/23388* (2013.01)

(58) Field of Classification Search
CPC ........ B60R 21/207; B60R 2021/23146; B60R 2021/23161; B60R 2021/23386; B60R 2021/23382
See application file for complete search history.

(56) References Cited

U.S. PATENT DOCUMENTS

2005/0236819 A1* 10/2005 Riedel .................. B60R 21/207
280/730.2
2006/0038386 A1* 2/2006 Shibayama ....... B60R 21/23138
280/730.2
2006/0119082 A1* 6/2006 Peng .................. B60R 21/2338
280/730.2

(Continued)

FOREIGN PATENT DOCUMENTS

CA        2 879 525 A1    1/2014
JP        2005-306377 A   11/2005

(Continued)

*Primary Examiner* — Ruth Ilan
(74) *Attorney, Agent, or Firm* — Oliff PLC

(57) ABSTRACT

A side airbag of a far side airbag device includes a rear inflation section that inflates and deploys on being supplied with gas and restrains at least rear portions of the chest and abdominal regions of a seated occupant, and a front inflation section that inflates and deploys by being supplied with gas through a through hole formed at a boundary between the rear inflation section and the front inflation section to restrain at least front portions of the chest and abdominal regions of the seated occupant. The far side airbag device includes a tension member that, on receiving tension and adopting a deployed state accompanying inflation and deployment of the side airbag, has a front end side connected to the rear inflation section, and a rear end side connected to a seatback frame.

7 Claims, 10 Drawing Sheets

(56) References Cited

U.S. PATENT DOCUMENTS

| | | | |
|---|---|---|---|
| 2006/0119083 A1* | 6/2006 | Peng | B60R 21/207 280/730.2 |
| 2010/0194083 A1* | 8/2010 | Sugimoto | B60R 21/207 280/730.2 |
| 2011/0025034 A1 | 2/2011 | Lim et al. | |
| 2012/0049498 A1* | 3/2012 | Wiik | B60R 21/23138 280/743.2 |
| 2012/0091697 A1* | 4/2012 | Wiik | B60R 21/23138 280/730.2 |
| 2012/0181780 A1 | 7/2012 | Rickenbach et al. | |
| 2013/0200597 A1 | 8/2013 | Honda et al. | |
| 2014/0035264 A1* | 2/2014 | Fukushima | B60R 21/23138 280/730.2 |
| 2014/0151984 A1* | 6/2014 | Fukawatase | B60R 21/233 280/730.2 |
| 2016/0031407 A1* | 2/2016 | Yamanaka | B60R 21/233 280/728.2 |
| 2016/0114755 A1* | 4/2016 | Matsuzaki | B60R 21/2338 280/730.2 |

FOREIGN PATENT DOCUMENTS

| | | | | |
|---|---|---|---|---|
| JP | 2008-302897 A | | 12/2008 | |
| JP | 2012-025182 A | | 2/2012 | |
| JP | 2012-051557 A | | 3/2012 | |
| JP | 2012-081958 A | | 4/2012 | |
| JP | 2013-159305 A | | 8/2013 | |
| JP | 2014-031096 A | | 2/2014 | |
| JP | 2014-502580 A | | 2/2014 | |
| SE | GB 2357999 A | * | 7/2001 | B60R 21/207 |
| WO | 2014/013822 A1 | | 1/2014 | |
| WO | 2015/075984 A1 | | 5/2015 | |

\* cited by examiner

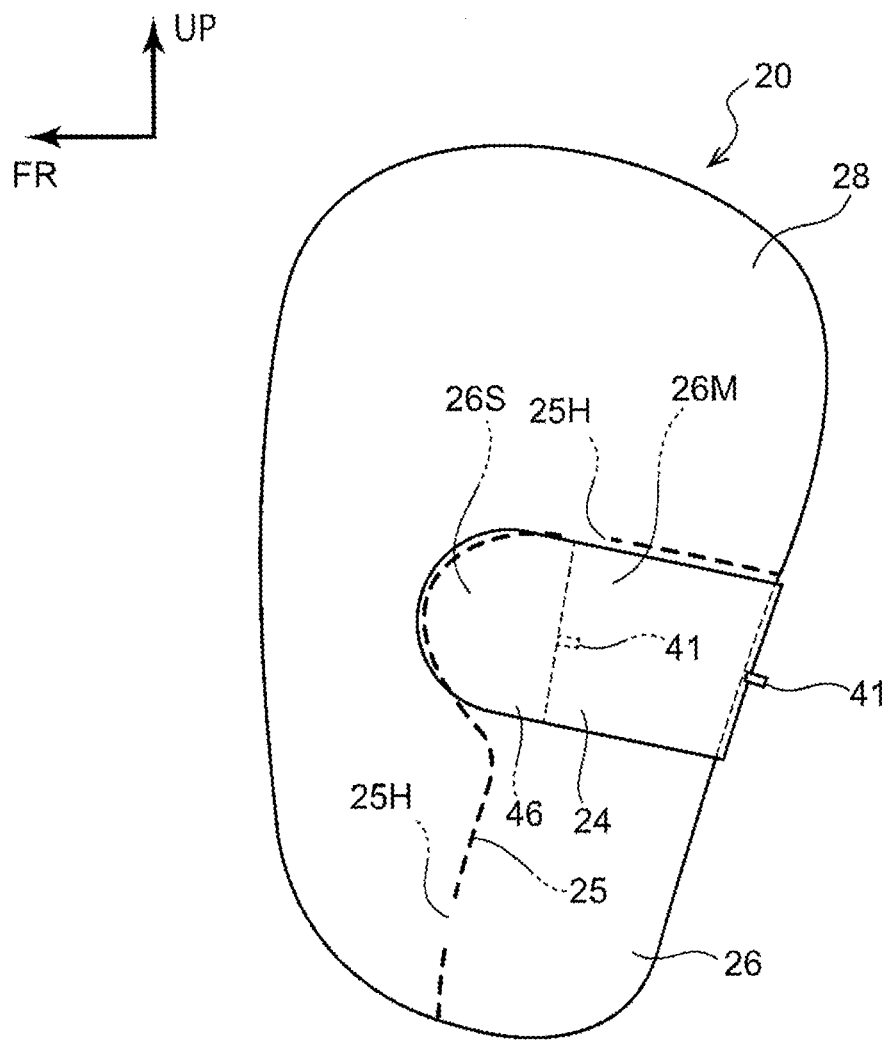

SIDE AIRBAG DEVICE

CROSS-REFERENCE TO RELATED APPLICATION

This application is based on and claims priority under 35 USC 119 from Japanese Patent Application No. 2014-128633 filed on Jun. 23, 2014, which is incorporated by reference herein.

BACKGROUND

Technical Field

The present invention relates to a side airbag device.

Related Art

An airbag device is known with an airbag bag body of a single bag body that inflates and deploys over a region from a seat back lower portion of a seated occupant to a headrest side portion (see Japanese Patent Application Laid-Open (JP-A) No. 2012-051557 (Patent Document 1)). An airbag device is also known including a side airbag that is sectioned into a rear bag section in which an inflator is disposed, and a front bag section supplied with gas from the rear bag section through a communication opening (see International Publication (WO) No. 2014/013822 (Patent Document 2)).

SUMMARY

Technical Problem

In the configuration described in Patent Document 2, the rear bag section inflates and deploys with a higher internal pressure than that of the front bag section. In an airbag sectioned in this manner so that a difference in internal pressure occurs between the front and rear of the bag, there is a concern that the rear bag section might be pulled forward when inflating and deploying, and might inflate and deploy while displaced forward of the target inflated and deployed position. If the rear bag section is displaced forward and inflated and deployed then the rear bag section with high internal pressure is liable to interfere with a seated occupant when the seated occupant is in an irregular seated posture. There is accordingly room for improvement regarding this point.

An object of the present invention is to obtain a side airbag device that suppresses forward movement of a rear inflation section accompanying inflation and deployment of a side airbag.

Solution to Problem

A side airbag device according to a first aspect includes: a side airbag that is provided at a side portion of a seatback, and includes a rear inflation section that inflates and deploys at the side of at least rear portions of the chest and abdominal regions of a seated occupant on receipt of supplied gas, and a front inflation section that inflates and deploys at the side of at least front portions of the chest and abdominal regions of the seated occupant on receipt of gas supplied from the rear inflation section through a communication path formed at a boundary between the rear inflation section and the front inflation section; and a tension member that receives tension and deploys accompanying inflation and deployment of the side airbag, wherein in a deployed state, a front end side of the tension member in the vehicle front-rear direction is connected to the rear inflation section, and the rear end side of the tension member in the vehicle front-rear direction is connected to a frame of the seatback.

In this side airbag device, when gas is supplied to the rear inflation section in a side-on collision, for example, the rear inflation section is inflated and deployed, and the front inflation section supplied with gas from the rear inflation section, via the communication path, inflates and deploys. The rear inflation section that makes contact with the relatively high resilience rear portions of the chest and abdominal regions of the seated occupant is accordingly inflated and deployed at a relatively high internal pressure, and the front inflation section that makes contact with the relatively low resilience front portions of the chest and abdominal regions of the seated occupant is inflated and deployed at a relatively low internal pressure.

Accompanying inflation and deployment of the side airbag, the tension member deploys between connection portions to the rear inflation section and the seatback frame while receiving tension. Forward movement with respect to the frame of the seatback of the rear inflation section that deploys at a relatively high internal pressure is restricted by the tension member.

The first aspect accordingly suppresses forward movement of the rear inflation section accompanying inflation and deployment of the side airbag.

A side airbag device according to second aspect is the first aspect, wherein the rear inflation section, in an inflated and deployed state, includes a shoulder restraining section that projects out further forward than an inflated and deployed portion positioned at the side of the rear portions of the chest and abdominal regions of the seated occupant to a position at the side of the shoulder region of the seated occupant, and in the inflated and deployed state of the rear inflation section, a front end side of the tension member is connected to a front end portion of the shoulder restraining section in the vehicle front-rear direction.

In this side airbag device, the shoulder restraining section of the side airbag is able to effectively restrain the seated occupant at the shoulder region, which is a location of high resilience. The shoulder restraining section projects out further forward than other portions, and on moving forward is therefore liable to interfere with a seated occupant adopting an irregular seated posture. However, forward movement of the shoulder restraining section with respect to the seatback frame is restricted by the tension member as described above.

The side airbag device according to the third aspect is the first or the second aspect, wherein the tension member includes an outside tension member that deploys to the outside of the rear inflation section in the seat width direction.

In this side airbag device, the tension member restricts forward movement of the rear inflation section with respect to the seatback frame from the outside, which is the side further away in the seat width direction from the frame of the seatback, this being the side airbag support side.

A side airbag device according to a fourth aspect is the third aspect, wherein the outside tension member has a peripheral length in plan view from the front end side to the rear end side that is the same length, or shorter than a peripheral length from a fixing location of the rear inflation section to the frame to a connection location of the rear inflation section and the front end side of the outside tension member.

In this side airbag device, the front end of the outside tension member moves forward accompanying inflation and deployment of the side airbag (rear inflation section), and tension acts on the outside tension member. The peripheral length of the outside tension member is the same length, or shorter than, the peripheral length from the fixing location of the side airbag to the frame of the seatback, to the connection location to the front end side of the outside tension member. Forward movement of the rear inflation section with respect to the frame of the seatback is thereby effectively restricted by the outside tension member.

A side airbag device according to the fifth aspect is any one of the first to the fourth aspects, wherein the tension member includes an inside tension member that deploys to the inside of the rear inflation section in the seat width direction.

In this side airbag device, the tension member restricts forward movement of the rear inflation section with respect to the seatback frame from the seatback frame side, namely the seat width direction inside, which is the side airbag support side.

The side airbag device according to the sixth aspect is any one of the first to the fifth aspects, wherein the tension member includes an in-bag tension member including at least a portion that is a portion deploying inside the rear inflation section.

In this side airbag device, the tension member restricts forward movement of the rear inflation section with respect to the seatback frame at an internal portion of the rear inflation section in the side airbag.

The side airbag device according to a seventh aspect is of any one of the first to the sixth aspects, wherein at least one of the rear end side of tension member and the side airbag is anchored to an anchor member that is fixed to the seatback frame.

A side airbag device according to an eighth aspect is any one of the first to the seventh aspects, wherein the side airbag is provided at a side portion on the vehicle center side of the seatback in the vehicle width direction, and inflates and deploys to the vehicle center side of the seatback in the vehicle width direction.

This side airbag device is a far side airbag device in which the side airbag inflates and deploys at the vehicle center side of the seatback in the vehicle width direction.

The side airbag device according to a ninth aspect is any one of the first to the eighth aspects, wherein the boundary between the rear inflation section and the front inflation section is formed by a tether that extends in the seat width direction and partitions the side airbag into the rear inflation section and the front inflation section.

The side airbag device according to a tenth aspect is any one of the first to the eighth aspects, wherein the boundary between the rear inflation section and the front inflation section is formed by a seam where base cloths at two sides in the vehicle width direction of the side airbag are sewn together at the boundary between the rear inflation section and the front inflation section, and the communication path between the rear inflation section and the front inflation section is formed as a non-connected portion of the seam.

As explained above, the side airbag device according to the present invention exhibits the excellent advantageous effect of suppressing forward movement of a rear inflation section accompanying inflation and deployment of a side airbag.

BRIEF DESCRIPTION OF DRAWINGS

FIG. 3 is a side view illustrating an external shape of a side airbag and tension cloth configuring a far side airbag device according to the first exemplary embodiment of the present invention.

DESCRIPTION OF EMBODIMENTS

First Exemplary Embodiment

Figure 1:
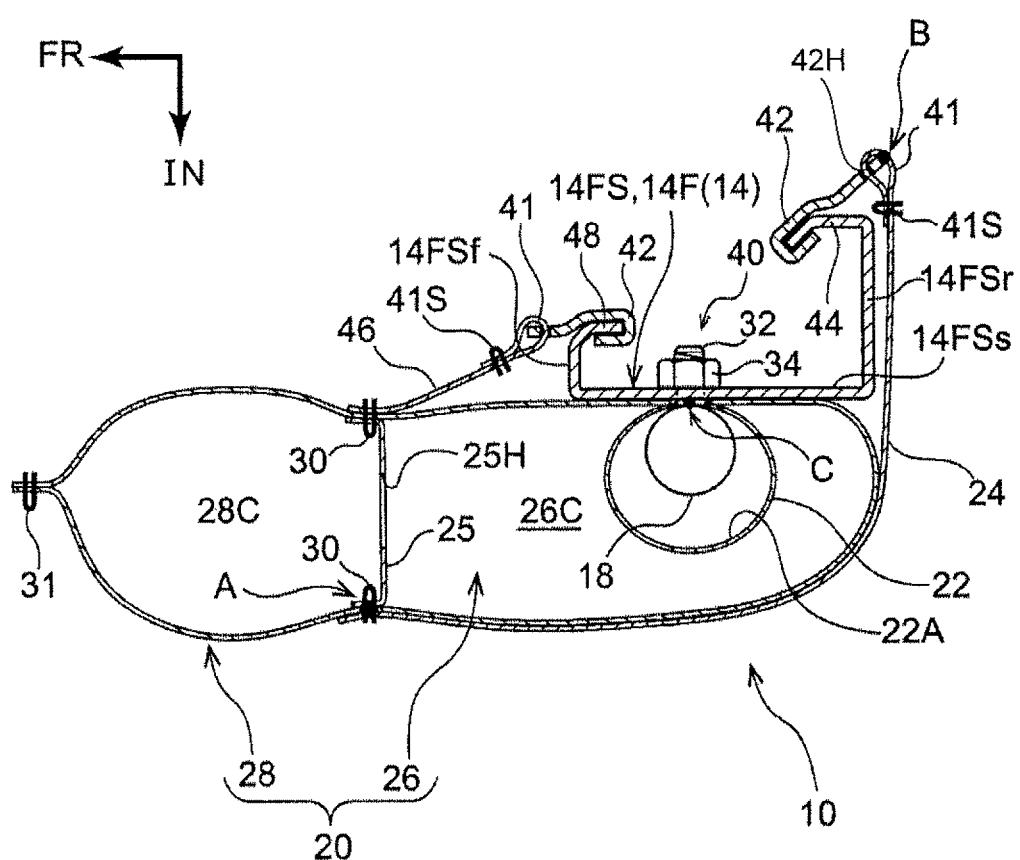
FIG. 1 is a diagram illustrating relevant portions of a far side airbag device according to a first exemplary embodiment of the present invention, and is an enlarged cross-section taken along line 1-1 in FIG. 2.
Figure 2:
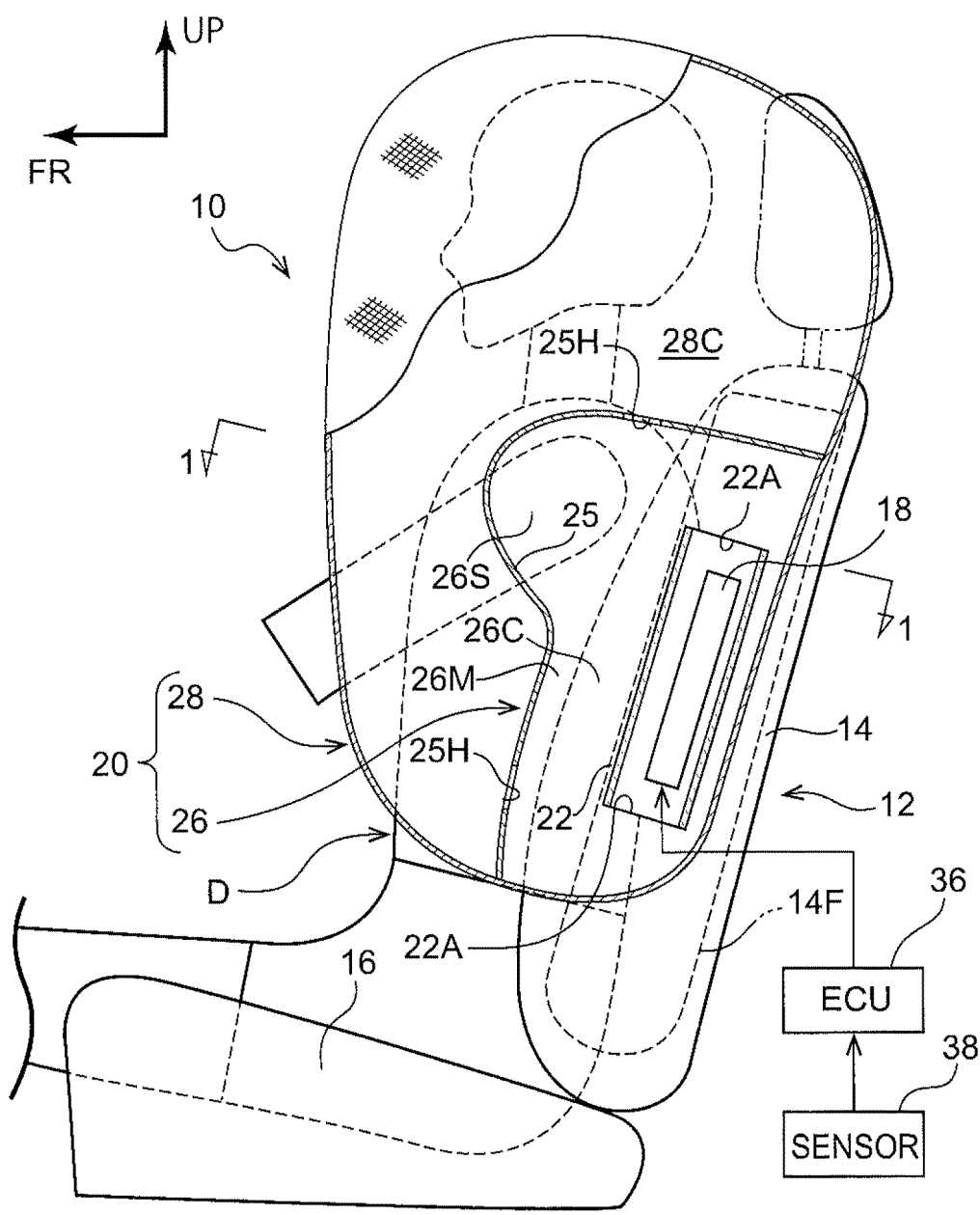
FIG. 2 is a side view of a schematic overall configuration of a far side airbag device according to a first aspect of the present invention, wherein a portion of a side airbag in an inflated and deployed state has been cutaway.

Explanation follows regarding a far side airbag device 10 as an example of a side airbag device according to the first exemplary embodiment of the present invention, with reference to FIG. 1 to FIG. 3. In each of the drawings, the arrow FR, arrow UP, and arrow IN appropriately indicate a vehicle front direction, upper direction, and vehicle center side in the vehicle width direction, respectively. Reference in the following simply to front-rear, up-down, and left-right directions indicate the front-rear in the vehicle front-rear direction, up-down in the vehicle up-down direction, and the left-right facing forward in the vehicle front-rear direction, unless stated otherwise.

Schematic Overall Configuration of Far Side Airbag Device

As illustrated in FIG. 2, the far side airbag device 10 is installed in a seatback 14 of a vehicle seat 12. More specifically, the vehicle seat 12 is disposed offset to either the left or right (the right side in the illustrated example) of a vehicle width direction center in an automobile, not illustrated in the drawings, and the far side airbag device 10 is installed in a side portion at the vehicle center side in the vehicle width direction of the seatback 14.

In the present exemplary embodiment, the vehicle seat 12 is a front seat (first row seat), namely the driver's seat or front passenger seat, and the front-rear direction, the up-down direction, and the width (left-right) direction of the vehicle seat 12 are aligned with the front-rear direction, up-down direction, and vehicle width direction of an automobile. In the following explanation, the width direction of the vehicle seat 12 is sometimes referred to as the seat width direction.

In FIG. 2, a crash test dummy (mannequin) D is illustrated in a seated state on a seat cushion 16 of the vehicle seat 12. The dummy D is, for example, a World Side Impact Dummy (World SID) of a $50^{th}$ percentile American adult male (AM50). The dummy D is seated in the standard seated posture determined by the crash test method, and the vehicle seat 12 is positioned at a standard setting position corresponding to the seated posture. For ease of explanation, the dummy D is referred to hereafter as seated occupant D.

As explained in detail later, in the event of a side-on collision from the opposite side in the vehicle width direction (the far side) to the side on which the vehicle seat 12 is installed, the far side airbag device 10 restricts movement of the seated occupant D in the vehicle seat 12 toward the collision side. Namely, the far side airbag device 10 is configured to restrain the seated occupant D from the collision side in the event of a side-on collision to the far side.

The far side airbag device 10 includes an inflator 18 serving as a gas generation device, and a side airbag 20 that inflates and deploys on receipt of gas supplied from the inflator 18. In this exemplary embodiment, the far side airbag device 10 further includes a flow regulator cloth 22 provided at the inside of the side airbag 20, and tension cloths 24, 46 provided at the seat width direction outside and inside of the side airbag 20.

The far side airbag device 10 is configured as a module from the side airbag 20, the flow regulator cloth 22, the tension cloths 24, 46, the inflator 18 etc. Although not illustrated, the far side airbag device 10 is disposed (housed) inside a side portion at the vehicle width direction vehicle center side of the seatback 14, with the side airbag 20, the flow regulator cloth 22, and the tension cloth 24 in a folded state.

The side airbag 20 is configured so as to inflate and deploy to the front side with respect to the seatback 14, and at the vehicle center side in the vehicle width direction (the seat width direction outside) of the seated occupant D, on receipt of gas supplied from the inflator 18. In following explanation, the shape of the side airbag 20 refers to the shape in the inflated and deployed state, unless stated otherwise.

The side airbag 20 is partitioned (divided) into two inflation sections 26, 28 adjacent to the front and rear of each other. More specifically, the side airbag 20 is partitioned into the rear inflation section 26 forming the rear lower portion of the side airbag 20 in side view, and the front inflation section 28 forming the remaining portion thereof. In other words, the internal space of the side airbag 20 is segmented into a rear chamber 26C of the space inside the rear inflation section 26, and a front chamber 28C of the space inside the front inflation section 28.

In the present exemplary embodiment, as illustrated in FIG. 1, the side airbag 20 is segmented (partitioned) into the rear inflation section 26 and the front inflation section 28 by a tether 25 that is a segmentation cloth extending in the seat width direction. Through holes 25H are formed as a communication path in the tether 25. Both ends in the seat width direction of the tether 25 are sewn to the base cloth of the side airbag 20 at seams 30.

Moreover, as illustrated in FIG. 2, the rear inflation section 26 includes a rectangular shaped main inflation section 26M that is long in the up-down direction and disposed along the seatback 14 in side view, and an auxiliary inflation section 26S that projects out to the front from the upper end side of the main inflation section 26M. The main inflation section 26M inflates and deploys mainly to the seat width direction outside of the rear portions of the chest and abdominal regions of the seated occupant D, so as to restrain the rear portions of the chest and abdominal regions from the vehicle center side in the vehicle width direction. The auxiliary inflation section 26S inflates and deploys mainly to the seat width direction outside of shoulder region of the seated occupant D, so as to restrain the shoulder region from the vehicle width direction vehicle center side. The auxiliary inflation section 26S corresponds to the shoulder restraining section of the present invention.

As illustrated in FIG. 3, the front inflation section 28, namely the front chamber 28C, is formed in an inverted L-shape in side view, so as to be adjacent at the front and above the rear inflation section 26. The tether 25 sectioning between the front inflation section 28 and the rear inflation section 26 is accordingly also formed in an inverted L-shape in side view. The front inflation section 28 inflates and deploys mainly to the seat width direction outside of the front portions of the chest and abdominal regions, and the head, of the seated occupant D, so as to restrain the front portions of the chest and abdominal regions, and the head, from the vehicle width direction vehicle center side.

The inflator 18 is disposed in the rear chamber 26C, and is configured to generate gas inside the rear chamber 26C (to supply gas into the rear chamber 26C). The rear chamber 26C and the front chamber 28C are in communication with each other through the through holes 25H. In the exemplary embodiment there is a through hole 25H passing from a lower portion of the rear chamber 26C (the main inflation section 26M) forward into the front chamber 28C, and there is a through hole 25H passing from an upper portion of the rear chamber 26C (the main inflation section 26M) upward into the front chamber 28C.

The front chamber 28C is accordingly supplied with gas from the inflator 18 through the rear chamber 26C. In the side airbag 20, due to the gas from the inflator 18 being supplied to the front chamber 28C through the through holes 25H after being supplied into the rear chamber 26C in this manner, the internal pressure of the rear inflation section 26 is configured so as to be higher than the internal pressure of the front inflation section 28 in the inflated and deployed state. In the present exemplary embodiment, due to configuration with the inflator 18 disposed inside the rear chamber 26C, and due to the rear chamber 26C and the front chamber 28C being configured in communication with each other through the through holes 25H, an internal pressure adjustment means is configured to achieve a higher internal pressure of the rear inflation section 26 than the internal pressure of the front inflation section 28.

The side airbag 20 described above is, for example, formed in a bag shape by stitching upper and lower edges, and the front edge of a base cloth that has been folded over at the rear end, and by partitioning between the front inflation section 28 and the rear inflation section 26 using the tether 25. A material such as a nylon or a polyester may be employed as the base cloth. Stitching of the base cloth at the front edge (and the upper and lower edges) of the side airbag 20 is configured by the seam 31 as illustrated in FIG. 1.

As illustrated in FIG. 2, the inflator 18 is what is known as a cylinder type inflator, and is disposed in the rear chamber 26C as stated above, in an orientation such that its length direction runs along the length direction of the seatback 14 (a substantially up-down direction) in side view. In the present exemplary embodiment, the flow regulator cloth 22 housing the inflator 18 is also disposed in the rear chamber 26C, together with the inflator 18. The flow regulator cloth 22 is formed in a tubular shape from material similar to the base cloth of the side airbag 20, and, similarly to the inflator 18, is disposed in the rear chamber 26C in an orientation having its length direction substantially along the up-down direction.

The flow regulator cloth 22 has openings 22A at respective upper and lower ends. A configuration is thereby achieved in which gas generated by the inflator 18 passes through the upper and lower openings 22A of the flow regulator cloth 22, and is supplied into the rear chamber 26C. Namely, the flow regulator cloth 22 is configured to inflate and deploy in a circular tubular shape by gas from the inflator 18, and functions as what is known as a diffuser.

The side airbag 20 and the flow regulator cloth 22 that have been explained above are fixed with the inflator 18 to a seatback frame 14F that is a frame of the seatback 14. More specifically, as illustrated in FIG. 1, stud bolts 32 project out toward the seat width direction inside from an outer peripheral portion of the inflator 18. Although not illustrated, there are plural of the stud bolts 32 disposed at intervals along the up-down direction. A nut 34 is screwed onto the leading end side of each of the stud bolts 32 in a state in which the stud bolts 32 have been passed through the base cloth forming the rear inflation section 26 of the side airbag 20, the base cloth of the flow regulator cloth 22, and a side frame 14FS (a side wall 14FSs, described below) of the seatback frame 14F.

The side airbag 20 and the flow regulator cloth 22 are accordingly fastened and fixed to the side frame 14FS of the seatback frame 14F by the inflator 18. A fastening structure 40 configured by the inflator 18 (the stud bolts 32 and the nut 34) is the fixing location where the rear inflation section 26 is fixed to the seatback frame 14F.

The above inflator 18 is, as illustrated in FIG. 2, electrically connected to an ECU 36 that is a control device. A sensor 38 that detects a side-on collision of the vehicle to which the far side airbag device 10 has been applied is electrically connected to the ECU 36. The sensor 38 in this exemplary embodiment is capable of detecting the occurrence of a side-on collision (or the inevitability of a side-on collision), and the side on which side-on collision occurs (right side or left side). The ECU 36 and the sensor 38 may be taken as being configuration elements of the far side airbag device 10 of the present exemplary embodiment.

The ECU 36 is configured to actuate the inflator 18 on notification of a side-on collision of the vehicle (or inevitability thereof) based on a signal from the sensor 38. In the present exemplary embodiment, in a side-on collision, the ECU 36 is configured to actuate the inflator 18 configuring the far side airbag device 10 disposed on the vehicle width direction opposite side (far side) of the vehicle seat 12 to the side-on collision side.

Tension Cloth at Seat Width Direction Outside

As described above, the tension cloth 24 is provided as an outside tension member at the seat width direction outside (vehicle center side) in the vehicle width direction of the side airbag 20. One end of the tension cloth 24 is connected to the side airbag 20, and another end of the tension cloth 24 is connected to the seatback frame 14F. The tension cloth 24 is configured to deploy on receipt of tension in the front-rear direction accompanying the inflation and deployment of the side airbag 20. More specific explanation follows. In the following explanation, the shape of the tension cloth 24 refers to the shape in the deployed state, unless stated otherwise.

As illustrated in FIG. 3, the tension cloth 24 of the present exemplary embodiment is formed in a shape that is elongated along the front-rear direction, so as to cover an upper portion of the rear inflation section 26 in side view (a portion including the auxiliary inflation section 26S). As illustrated in FIG. 1, the front end side of the tension cloth 24 is connected to the side airbag 20 at the boundary between the rear inflation section 26 and the front inflation section 28. In the present exemplary embodiment, the front end side of the tension cloth 24 is stitched to the base cloth of the side airbag 20 at the seat width direction outside at a common seam 30 (stitching) to that of the tether 25 that partitions the side airbag 20 into the rear inflation section 26 and the front inflation section 28. The front end side of the tension cloth 24 is thereby connected to the rear inflation section 26 at a front end portion of the auxiliary inflation section 26S.

As illustrated in FIG. 1, the rear end side of the tension cloth 24 is connected to the side frame 14FS of the seatback frame 14F at a rear wall 14FSr. As additional explanation regarding the side frame 14FS, the side frame 14FS includes the side wall 14FSs, a front wall 14FSf extending inwards in the seat width direction from the front edge of the side wall 14FSs, and the rear wall 14FSr extending inwards in the seat width direction from the rear edge of the side wall 14FSs. The fastening structure 40 fixes the side airbag 20 at the vicinity of the front-rear direction center of the side wall 14FSs of the side frame 14FS. The rear end side of the tension cloth 24 is connected to the rear wall 14FSr that is positioned further to the rear side than the fastening structure 40.

More specifically, a hook member 42 is anchored to the rear end of the tension cloth 24, and the hook member 42 hooks onto a flange 44 that juts out forward from the seat width direction inside end of the rear wall 14FSr of the seatback frame 14F. The rear end of the tension cloth 24 is thereby connected to the seatback frame 14F.

Further explanation follows regarding the anchor structure between the hook member 42 and the tension cloth 24. An anchor tab 41 is provided so as to extend out from the rear edge portion of the tension cloth 24, and the anchor tab 41 is folded back on itself in an inserted state through an anchor hole 42H formed in the hook member 42. The folded back leading end side of the anchor tab 41 is joined to the tension cloth 24 (to the main body or the anchor tab 41) by stitching at a seam 41S. Each of the anchor tabs 41 is thereby anchored to a hook member 42, and the rear edge portion of the tension cloth 24 is connected to the seatback frame 14F. In the present exemplary embodiment, there is a single location in the up-down direction as the connection location between the rear end portion of the tension cloth 24 and the seatback frame 14F.

The peripheral length in plan view of the tension cloth 24 from the connection location to the rear inflation section 26 (the front edge, see point A in FIG. 1), to the anchor location to the hook member 42 (the rear edge, see point B in FIG. 1) is denoted L24. The peripheral length in plan view of the rear inflation section 26 from the fixing location to the seatback frame 14F (see point C in FIG. 1) around the seat width direction outside to the connection location to the tension cloth 24 (see point A in FIG. 1) is denoted L20. The peripheral lengths L20, L24 are not labelled in the illustrations.

In the far side airbag device 10, the peripheral length L24 of the tension cloth 24 is a length the same as, or shorter than, the peripheral length L20 of the side airbag 20 (L24<L20). Thereby, as illustrated in FIG. 1, when the side airbag 20 is inflated and deployed, the tension cloth 24 receives tension from the rear inflation section 26 pressing toward the vehicle width direction outside (the vehicle center side in the vehicle width direction).

Tension Cloth at Seat Width Direction Inside

As illustrated in FIG. 1, the tension cloth 46 is provided as an inside tension member at the seat width direction inside in the vehicle width direction of the side airbag 20 as described above. One end of the tension cloth 46 is connected to a portion of the side airbag 20 positioned in front of the seatback frame 14F in the inflated and deployed state, and another end of the tension cloth 46 is connected to the seatback frame 14F. In other words, the front end side of the tension cloth 46 is connected to the side airbag 20, and the rear end side of the tension cloth 46 is connected to the seatback frame 14F. The tension cloth 46 is configured to deploy to cover at least a portion of the rear inflation section 26 in side view on receipt of tension accompanying the inflation and deployment of the side airbag 20. More specific explanation follows.

The front end of the tension cloth 46 is connected to the side airbag 20 at the boundary (partition portion) between the rear inflation section 26 and the front inflation section 28. In the present exemplary embodiment, the front end side of the tension cloth 46 is stitched to the base cloth of the seat width direction inside of the side airbag 20 by the common seam 30 (stitching) to that of the tether 25 that partitions the side airbag 20 into the rear inflation section 26 and the front inflation section 28. The front end side of the tension cloth 24 is thereby connected to the rear inflation section 26 at a front end portion of the auxiliary inflation section 26S.

As illustrated in FIG. 1, the rear end side of the tension cloth 46 is connected to the front wall 14FSf of the side frame 14FS of the seatback frame 14F. More specifically, a hook member 42 is anchored to the rear end of the tension cloth 46 through an anchor tab 41, and the hook member 42 is hooked onto a flange 48 that juts out rearwards from the seat width direction inside end of the front wall 14FSf of the seatback frame 14F. The rear end of the tension cloth 46 is thereby connected to the seatback frame 14F. In this exemplary embodiment, there is a single location in the up-down direction as the connection location between the rear end portion of the tension cloth 46 and the seatback frame 14F. The installation region of the tension cloth 46 in the up-down direction substantially overlaps with the installation region of the front portion of the tension cloth 24 in the up-down direction (see FIG. 3).

Operation and Advantageous Effects

Explanation next follows regarding operation of the first exemplary embodiment.

In the following explanation, operation is explained of the far side airbag device 10 applied to the vehicle seat 12 on the opposite side to the side where a side-on collision has occurred (opposite to the collision side, or the far side).

In the thus configured far side airbag device 10, the ECU 36 actuates the inflator 18 on notification of a side-on collision based on a signal from the sensor 38. Thus in the vehicle seat 12 at the far side, the gas generated by the inflator 18 is supplied to the rear chamber 26C of the side airbag 20 through the flow regulator cloth 22, and the rear inflation section 26 inflates and deploys to the vehicle center side in the vehicle width direction of the seated occupant D.

Gas is supplied from the rear chamber 26C through the through holes 25H to the front chamber 28C, and the front inflation section 28 is deployed and inflated in front of and above the rear inflation section 26. The internal pressure of the rear inflation section 26 is higher than the internal pressure of the front inflation section 28 in the inflated and deployed state of the side airbag 20.

The seated occupant D on the far side vehicle seat 12 is thereby firmly restrained at the rear portions of the chest and abdominal regions, and at the shoulder region, by the rear inflation section 26 at relatively high internal pressure, and is gently restrained at the front portions of the chest and abdominal regions, and the head, by the front inflation section 28 at relatively low internal pressure. In other words, movement toward the collision side is restricted while the rear portions of the chest and abdominal regions, and the shoulder region, which are locations on the human body with relatively high resilience (high rigidity), bear a large reaction force from the rear inflation section 26. However, movement toward the collision side is restricted while reaction force from the front inflation section 28 is suppressed to the front portions of the chest and abdominal regions, and the head, which are locations on the human body with relatively low resilience.

For example, in a comparative example equipped with a side airbag having a single-chamber, the internal pressure of the side airbag is an internal pressure of a similar order as that of the front inflation section 28 of the present exemplary embodiment, and is equivalent for each region. The restraining force on the rear portions of the chest and abdominal regions, and at the shoulder region, is therefore liable to be insufficient. In contrast thereto, the present exemplary embodiment enables the seated occupant D to be effectively restrained (protected from the side-on collision) by the rear inflation section 26 and the front inflation section 28 as described above.

Figure 10:
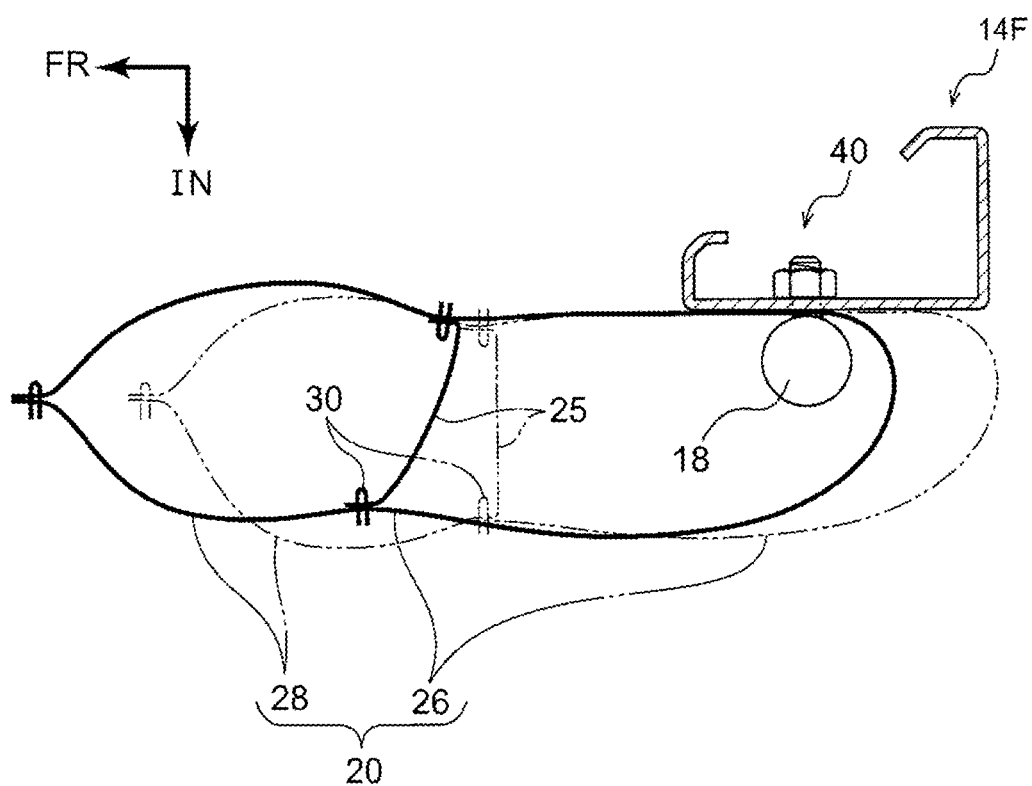
FIG. 10 is a cross-section schematically illustrating a manner in which a side airbag moves in a side airbag device according to a comparative example to the exemplary embodiments of the present invention.

However, due to the side airbag 20 being fixed to the seatback frame 14F at a single point of the fastening structure 40 in plan view, force acts in a direction to move the rear inflation section 26 toward the front accompanying inflation and deployment (gas flow). Thus in a comparative example not equipped with the tension cloths 24, 46, for example, there is a concern that the inflated and deployed position of the side airbag 20 is displaced in position forward, as illustrated by the continuous lines in FIG. 10, of the target inflated and deployed position, illustrated by the double dotted intermittent lines in FIG. 10. In particular, in a large volume side airbag 20 that should protect the head of the seated occupant D (a configuration in which the front inflation section 28 reaches above the rear inflation section 26), the rear inflation section 26 is liable to displace in position forward of the target inflated and deployed position. More specifically, the portion of the front inflation section 28 deploying to the side of the head is inflated and deployed above the contact position between the side airbag 20 and the seatback frame 14F. This portion is accordingly liable to swing up and down according to the degree of inflation and deployment, making the rear inflation section 26 liable to be displaced in position.

When the rear inflation section 26 that inflates and deploys with a relative high internal pressure is displaced in position as described above, there is a concern that the rear inflation section 26 interferes with the seated occupant D when the seated occupant D adopts an irregular seated posture (position) (when out of position (OOP)). In particular, the auxiliary inflation section 26S that projects forward with respect to the main inflation section 26M in the rear inflation section 26 is liable to interfere with the seated occupant D adopting the irregular seated posture.

Thus in the far side airbag device 10, the tension cloths 24, 46 that have their front end sides connected to the rear inflation section 26 and their rear end sides connected to the seatback frame 14F receive tension accompanying inflation and deployment of the side airbag 20. Movement of the rear inflation section 26 toward the front with respect to the seatback frame 14F is restricted by the tension cloths 24, 46, and the rear inflation section 26 is suppressed from being displaced in position from its target inflated and deployed position (any displacement in position is suppressed to a small amount).

Thus in the far side airbag device 10, movement of the rear inflation section 26 forward accompanying the inflation and deployment of the side airbag 20 is suppressed compared to a configuration not equipped with the tension cloths. Namely, the side airbag 20 is inflated and deployed with the rear inflation section 26 in a stable orientation (position). The rear inflation section 26, and in particular the auxiliary inflation section 26S, is accordingly suppressed from interfering with a seated occupant D adopting an irregular seated posture. Namely, the far side airbag device 10 contributes to a reduction in potential damage to a seated occupant D adopting an irregular seated posture arising from the rear inflation section 26 that is inflated and deployed with a relatively high internal pressure.

Further explanation follows regarding the restraining action (mechanism) of the rear inflation section 26 due to each of the tension cloths 24, 46. The tension cloth 24 serving as an outside tension member receives tension, and deploys, so as to press the rear inflation section 26 toward the seat width direction outside when the rear inflation section 26 inflates and deploys. Namely, the peripheral length L24 on the tension cloth 24 from the point A to the point B in FIG. 1 is the same as, or shorter than, the peripheral length L20 on the side airbag 20 from the point A to the point C in FIG. 1. Thus tension acts on the tension cloth 24 accompanying inflation and deployment of the side airbag 20. Movement of the rear inflation section 26 forward is restricted by the tension cloth 24 in the deployed state. In the comparative example illustrated in FIG. 10, the base cloth of the portion of the rear inflation section 26 that should inflate and deploy further to the rear than the inflator 18 wraps around to the front, and the rear inflation section 26 moves forward with respect to the seatback frame 14F. However, in the present exemplary embodiment, the movement of the rear inflation section 26 due to such wrapping around of the base cloth is restricted by the tension cloth 24.

Moreover, the front end side of the tension cloth 24 is connected to the rear inflation section 26 at the front end portion of the auxiliary inflation section 26S, thereby effectively restricting the forward movement of the auxiliary inflation section 26S that is susceptible to the issue of potential damage to the seated occupant D adopting an irregular seated posture.

The tension cloth 46 serving as the inside tension member deploys as it receives tension accompanying the inflation and deployment as the front end (the seam 30) of the rear inflation section 26 moves forward of the seatback frame 14F. Thus due to the rear inflation section 26 being pulled from the rear side by the tension cloth 46, forward movement of the rear inflation section 26 is restricted.

However, the front end side of the tension cloth 46 is connected to the rear inflation section 26 at the front end portion of the auxiliary inflation section 26S, effectively restricting forward movement of the auxiliary inflation section 26S that is susceptible to the issue of potential damage to the seated occupant D adopting an irregular seated posture.

In particular, due to the tension cloths 24, 46 being provided at both sides of the rear inflation section 26 in the seat width direction, the rear inflation section 26 is supported from the rear at both sides in the seat width direction, and stably inflates and deploys. Thus the far side airbag device 10 has a high contribution to reducing potential damage to a seated occupant D adopting an irregular seated posture from the rear inflation section 26 inflated and deployed with relatively high internal pressure. Moreover, the inflation and deployment position (orientation) of the side airbag 20 when restraining the seated occupant D during a side-on collision is readily maintained by the tension cloths 24, 46, contributing to raising the occupant restraining performance.

Modified Example of Connection Portion of Tension Cloth

Figure 4A:
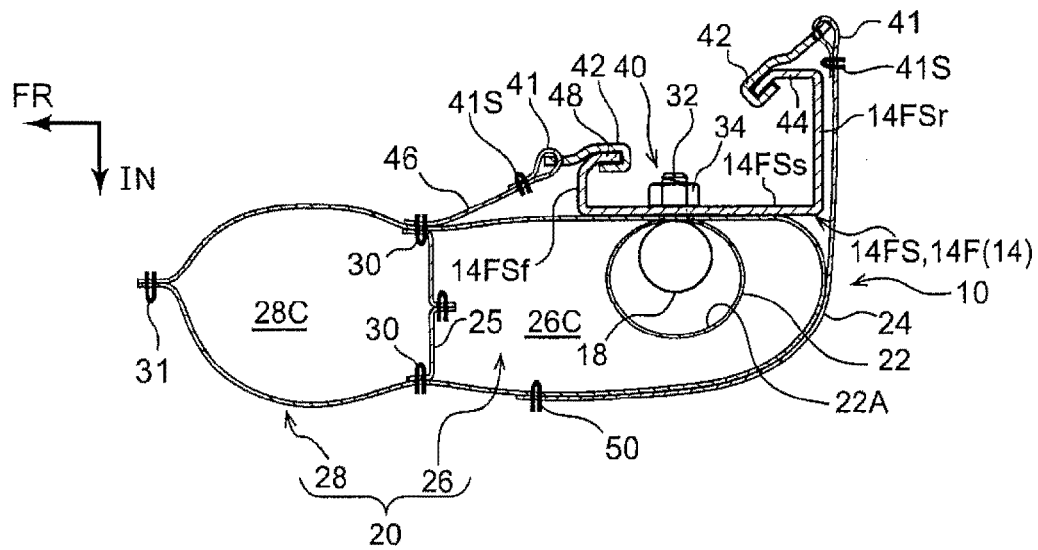
FIG. 4A is diagram illustrating a cross-section of a first modified example of a connection structure of a tension cloth configuring a far side airbag device according to an exemplary embodiment of the present invention.
Figure 4B:
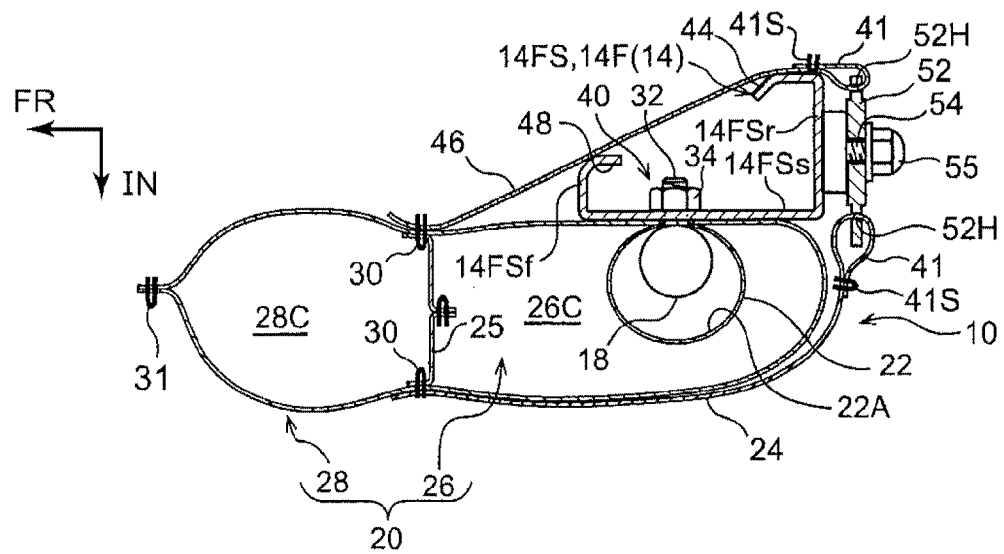
FIG. 4B is a cross-section of a second modified example of a connection structure of a tension cloth configuring a far side airbag device according to an exemplary embodiment of the present invention.
Figure 4C:
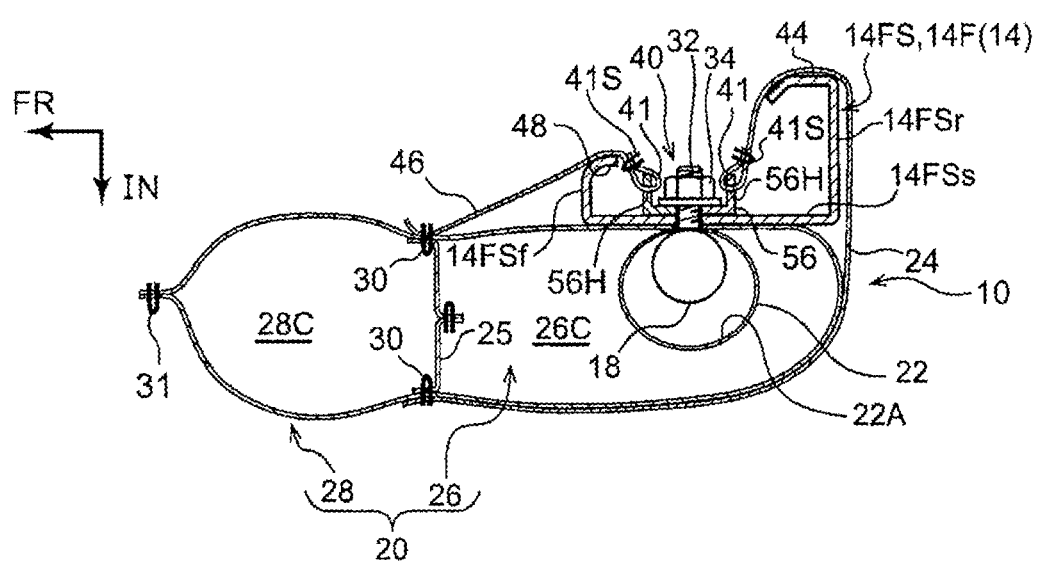
FIG. 4C is cross-section of a third modified example of a connection structure of a tension cloth configuring a far side airbag device according to an exemplary embodiment of the present invention.

FIG. 4A to FIG. 4C illustrate modified examples of connection portions and structures of the tension cloths. Explanation follows thereof.

In the first modified example illustrated in FIG. 4A, the front end side of a tension cloth 24 serving as an outside tension member is connected by stitching at a seam 50 to the base cloth at the seat width direction outside of the rear inflation section 26. Although not illustrated in the figures, the front end side of a tension cloth 46 serving as an inside tension member may also be connected by stitching to the base cloth at the seat width direction inside of the rear inflation section 26. The side airbag 20 in the example illustrated is an example in which a tether 25 is divided in the seat width direction (a two-ply structure), with a through hole 25H formed through at a non-illustrated position. The tether 25 may be configured similarly to that illustrated in FIG. 1 (similar applies hereafter in the present specification).

In a second modified example as illustrated in FIG. 4B, instead of the hook member 42, an anchor tab 41 at the rear end side of tension cloths 24, 46 is anchored to a plate 52 that has been fastened and fixed to a seatback frame 14F. More specifically, the plate 52 that is an anchor member is fixed to the seatback frame 14F by a nut 55 being screwed onto a weld stud bolt 54 fixed by welding to a rear wall 14FSr of the seatback frame 14F, in a state in which the weld stud bolt 54 passes through the plate 52. Anchor tabs 41 of each of the tension cloths 24, 46 are inserted into and anchored to anchor holes 52H formed in the two respective seat width direction ends of the plate 52.

In a third modified example illustrated in FIG. 4C, the rear end sides of tension cloths 24, 46 are connected to a seatback frame 14F together with an inflator 18 and side airbag 20 using a fastening structure 40. More specifically, a plate 56 is fixed to a side wall 14FSs of a seatback frame 14F by the fastening structure 40, and anchor tabs 41 of each of the tension cloths 24, 46 are inserted into and anchored to anchor holes 56H formed in the front and rear ends of the plate 56.

Figure 4D:
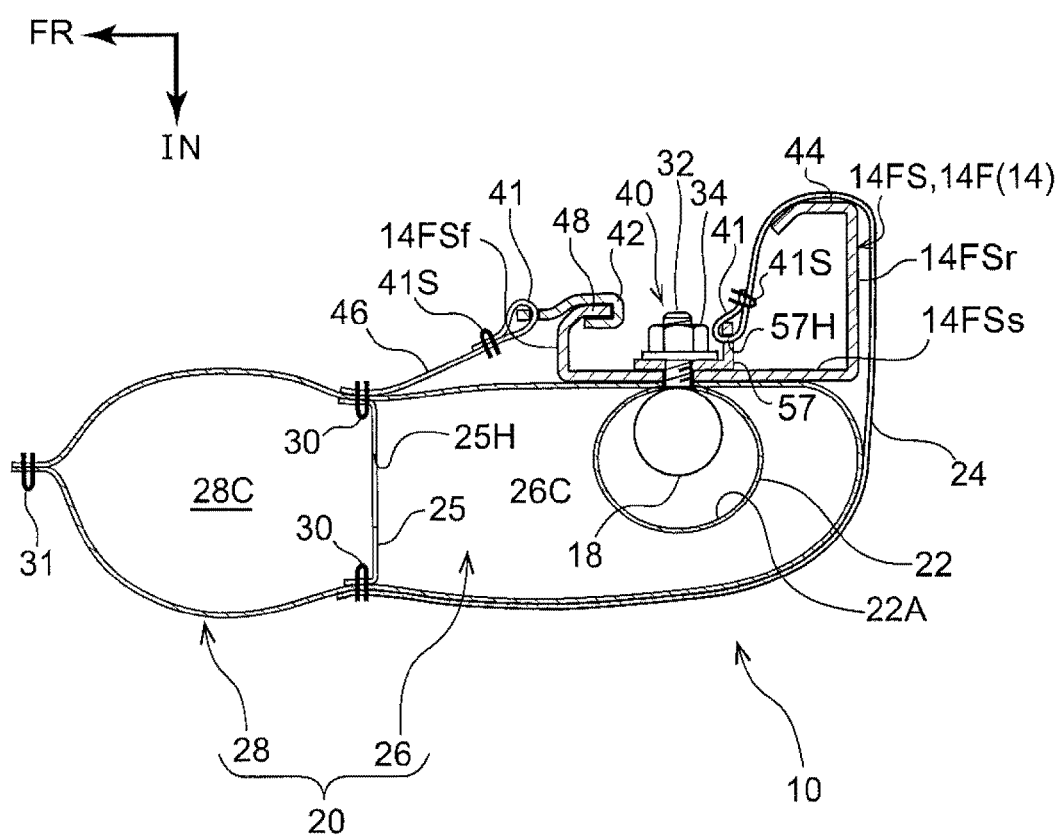
FIG. 4D is a cross-section illustrating a fourth modified example of a connection structure of a tension cloth configuring a far side airbag device according to an exemplary embodiment of the present invention.

In a fourth modified example illustrated in FIG. 4D, the rear end side of a tension cloth 24 is connected to a seatback frame 14F by a fastening structure 40 together with an inflator 18 and a side airbag 20. More specifically, a plate 57 is fixed to a side wall 14FSs of a seatback frame 14F by the fastening structure 40, and anchor tabs 41 of the tension cloth 24 are inserted into and anchored to anchor holes 57H formed in the rear end of the plate 57. The rear end of an inside tension cloth 46 is connected to the seatback frame 14F through a hook member 42.

Modified Example of Side Airbag

Figure 5:
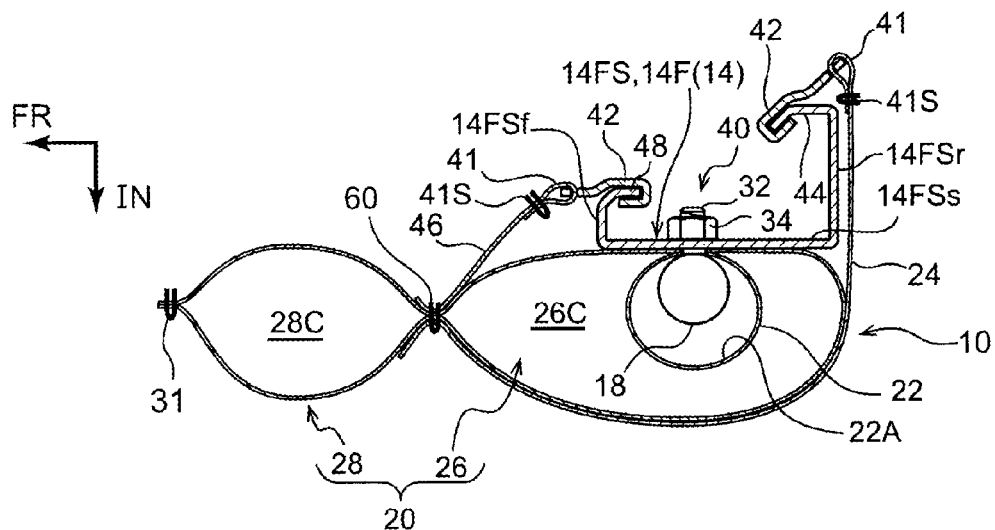
FIG. 5 is a cross-section of a modified example of a side airbag configuring a far side airbag device according to an exemplary embodiment of the present invention.

FIG. 5 illustrates a side airbag 58 according to a modified example. The side airbag 58 is formed with, instead of the tether 25, a seam 60 where base cloths at the two sides in the vehicle width direction of a side airbag 20 are sewn together at the boundary between a rear inflation section 26 and a front inflation section 28. A rear chamber 26C and a front chamber 28C are in communication with each other through a communication path (not illustrated in the drawings) formed as a portion where the seam 60 is not formed at the boundary between the rear chamber 26C and the front chamber 28C (a non-connected portion of the seam).

Other Exemplary Embodiments

Explanation next follows regarding other exemplary embodiments of the present invention. Configuration and operation basically the same as that of the first exemplary embodiment, each of the modified examples, or proceeding exemplary embodiments, is allocated the same reference numerals as that of the first exemplary embodiment, each of the modified examples, or proceeding exemplary embodiments, and sometimes explanation and illustration is omitted thereof.

Second Exemplary Embodiment

Figure 6:
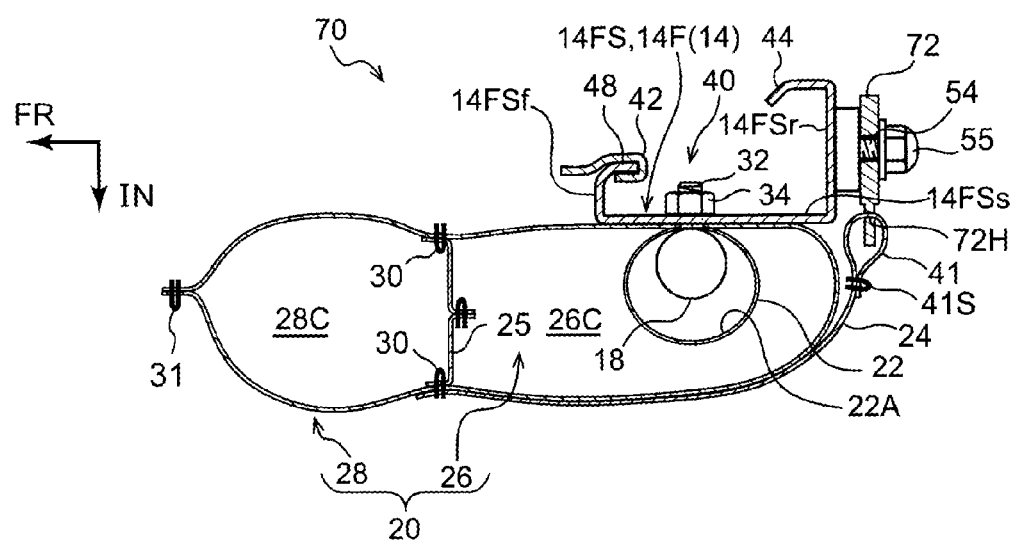
FIG. 6 illustrates relevant portions of a far side airbag device according to a second exemplary embodiment of the present invention, and is a cross-section corresponding to FIG. 1.

FIG. 6 illustrates a far side airbag device 70 according to a second exemplary embodiment of the present invention, and is a cross-section corresponding to FIG. 1. As illustrated in FIG. 6, the far side airbag device 70 differs from the far side airbag device 10 according to the first exemplary embodiment in that the far side airbag device 70 is not equipped with a tension cloth 46 serving as an inside tension member, and is equipped with a tension cloth 24 serving as an outside tension member.

Then rear end side of the tension cloth 24 in the example illustrated, namely an anchor tab 41, is anchored to an anchor hole 72H of a plate 72 fastened to the seatback frame 14F by a weld stud bolt 54 and a nut 55. The connection structure of the rear end side of the tension cloth 24 to the seatback frame 14F may be obtained by each type of the structures explained in the first exemplary embodiment, and each of the modified examples. Other configuration of the far side airbag device 70 is similar to that of the corresponding configuration of the far side airbag device 10, including non-illustrated portions.

Thus the far side airbag device 70 is also able to obtain fundamentally similar advantageous effects by operation similar to the far side airbag device 10, except for operation and advantageous effects due to provision of a tension cloth at the seat width direction inside.

Third Exemplary Embodiment

Figure 7:
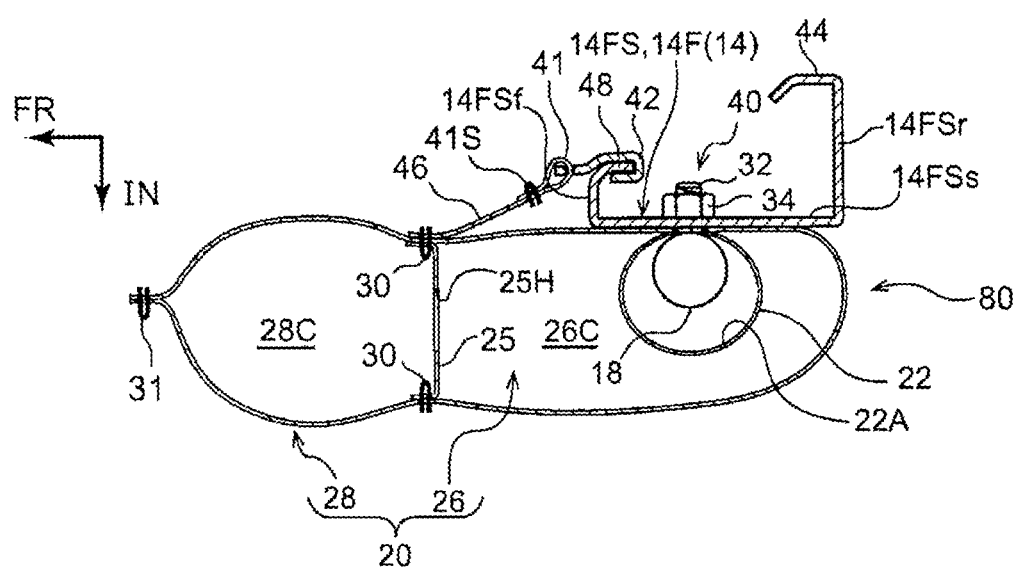
FIG. 7 illustrates relevant portions of a far side airbag device according to a third exemplary embodiment of the present invention, and is a cross-section corresponding to FIG. 2.

FIG. 7 illustrates a far side airbag device 80 according to a third exemplary embodiment of the present invention, and is a cross-section corresponding to FIG. 1. As illustrated in FIG. 7, the far side airbag device 80 differs from the far side airbag device 10 according to the first exemplary embodiment in that the far side airbag device 80 is not equipped with a tension cloth 24 serving as an outside tension member, and is equipped with a tension cloth 46 serving as an inside tension member.

The rear end side of the tension cloth 24 in the example illustrated, namely an anchor tab 41, is anchored to a hook member 42. The connection structure of the rear end side of the tension cloth 46 to the seatback frame 14F may be obtained by each type of the structures explained in each of the modified examples. Other configuration of the far side airbag device 80 is configuration similar to that of the corresponding configuration of the far side airbag device 10, including non-illustrated portions.

Thus the far side airbag device 80 is also able to obtain fundamentally similar advantageous effects by operation similar to the far side airbag device 10, except for operation and advantageous effects due to provision of tension cloths on both sides in the seat width direction.

Fourth Exemplary Embodiment

Figure 8:
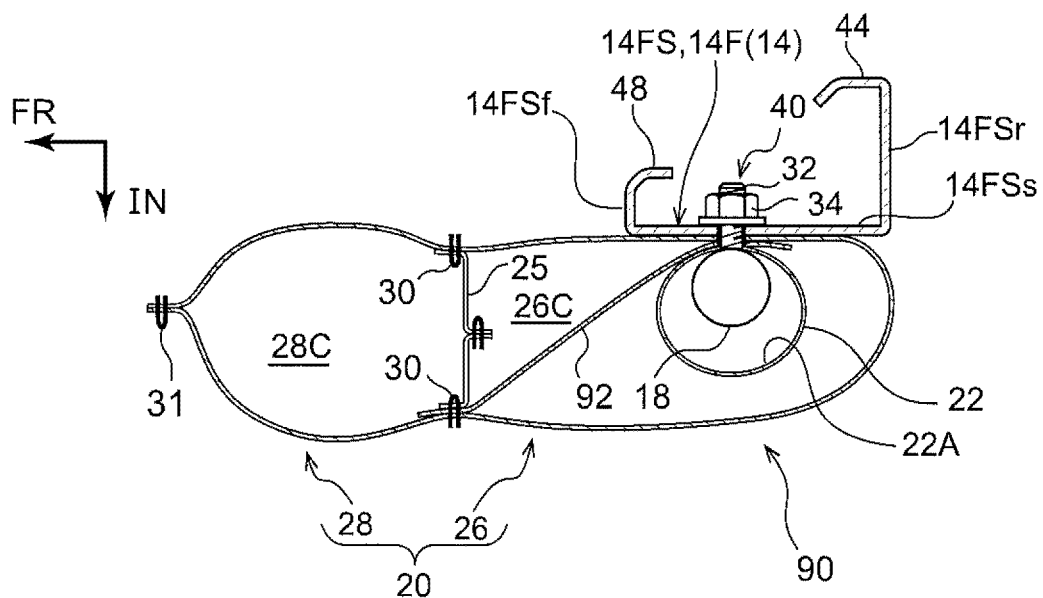
FIG. 8 illustrates relevant portions of a far side airbag device according to a fourth exemplary embodiment of the present invention, and is a cross-section corresponding to FIG. 1.

FIG. 8 illustrates a far side airbag device 90 according to a fourth exemplary embodiment of the present invention, and is a cross-section corresponding to FIG. 1. As illustrated in FIG. 8, the far side airbag device 90 is equipped with a tension cloth 92 serving as an in-bag tension member instead of the tension cloths 24, 46 disposed at both seat width direction sides of the side airbag 20. The far side airbag device 90 differs from the far side airbag device 10 according to the first exemplary embodiment in this respect.

The tension cloth 92 is disposed inside the rear chamber 26C, and a front end side of the tension cloth 92 is connected to the base cloth at the seat width direction outside of the side airbag 20, together with the tether 25, by a seam 30. In other words, the front end side of the tension cloth 92 is connected to a front end portion of the rear inflation section 26.

The rear end side of the tension cloth 92 is connected (jointly fastened) to a side wall 14FSs of the seatback frame 14F, together with the base cloth at the seat width direction inside of the side airbag 20 and a flow regulator cloth 22, by the fastening structure 40. Other configuration of the far side airbag device 90 is similar to corresponding configuration of the far side airbag device 10, including non-illustrated portions.

Thus the far side airbag device 90 is also able to obtain fundamentally similar advantageous effects by operation similar to the far side airbag device 10, except for operation and advantageous effects due to provision of tension cloths on both sides in the seat width direction. Further explanation follows regarding an operation (mechanism) to restrain the rear inflation section 26 by the tension cloth 92. The tension cloth 92, serving as an in-bag tension member, deploys as it receives tension accompanying inflation and deployment as the front end (the seam 30) of the rear inflation section 26 moves in front of the seatback frame 14F. The rear inflation section 26 is pulled from the rear side by the tension cloth 92, and forward movement of the rear inflation section 26 is restricted.

Fifth Exemplary Embodiment

Figure 9:
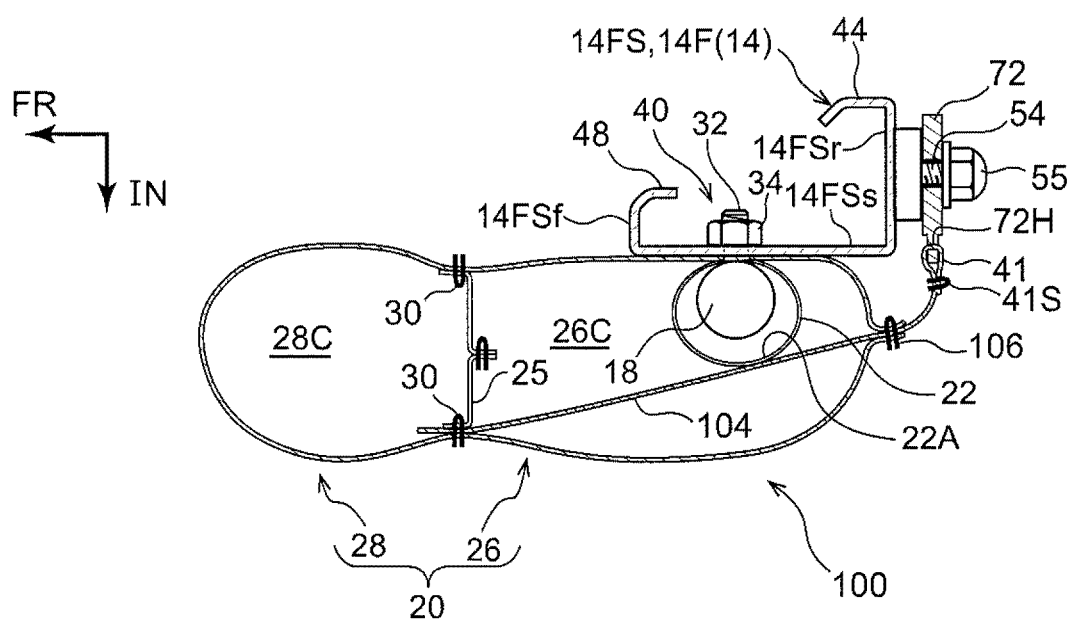
FIG. 9 illustrates relevant portions of a far side airbag device according to a fifth exemplary embodiment of the present invention, and is a cross-section corresponding to FIG. 1.

FIG. 9 illustrates a far side airbag device 100 of a fifth exemplary embodiment of the present invention, and is a cross-section corresponding to FIG. 1. As illustrated in FIG. 9, instead of the tension cloth 92 disposed inside the side airbag 20, the far side airbag device 100 is equipped with a tension cloth 104 serving as an in-bag tension member, with a portion of the tension cloth 104 disposed inside the side airbag 20. The far side airbag device 100 differs from the far side airbag device 90 of the fourth exemplary embodiment in this respect.

The side airbag 20 is formed in a bag shape by stitching upper and lower edges, and the rear edge of a base cloth that has been folded over at the front end, and by partitioning between a front inflation section 28 and a rear inflation section 26 using a tether 25. A material such as a nylon or a polyester may be employed as the base cloth. Stitching of the base cloth at the rear edge (and the upper and lower edges) of the side airbag 20 is configured the seam 106.

Except for a portion at the rear end side, the tension cloth 104 is disposed inside the rear chamber 26C, and the front end side of the tension cloth 104 is connected to the base cloth at the seat width direction outside of the side airbag 20, together with the tether 25, by a seam 30. In other words, the front end side of the tension cloth 104 is connected to a front end portion of a rear inflation section 26.

The rear end side of the tension cloth 104 passes through between base cloths overlapped in the seat width direction at the rear edge of the side airbag 20, and is guided to the rear direction outside of the rear inflation section 26. An air tight seal is secured by the seam 106 at the location on the rear edge of the side airbag 20 where the tension cloth 104 passes through.

The rear end side of the tension cloth 104 in the illustrated example is connected to a seatback frame 14F by an anchor tab 41 anchoring to an anchor hole 72H of a plate 72. Other configuration of the far side airbag device 100 is similar to corresponding configuration of the far side airbag device 90, including non-illustrated portions.

Thus the far side airbag device 100 is also able to obtain fundamentally similar advantageous effects by operation similar to the far side airbag device 90 (the far side airbag device 10). Further explanation follows regarding the operation (mechanism) to restrain the rear inflation section 26 by the tension cloth 104. The tension cloth 104, serving as an in-bag tension member, deploys on receipt of tension accompanying the inflation and deployment as the front end of the rear inflation section 26 (the seam 30) moves in front of the seatback frame 14F. The rear inflation section 26 is pulled to the rear side by the tension cloth 104 and forward movement of the rear inflation section 26 is restricted.

Modified Examples of the Fourth and Fifth Exemplary Embodiments

The fourth and fifth exemplary embodiments represent examples in which only the tension cloth 92, 104 is provided to serve as a tension cloth and the in-bag tension member, however the present invention is not limited thereto. For example, configuration may be made in which the tension cloth 92, 104 serving as an in-bag tension member is provided together with at least one of the tension cloth 24 that serves as an outside tension member, or the tension cloth 46 that serves as an inside tension member.

Moreover, the front end side of the tension cloth 92, 104 serving as an in-bag tension member, similarly to the front end side of the tension cloth 24 according to the first modified example, may also be connected by stitching to the base cloth at the seat width direction outside of the rear inflation section 26 (a portion further to the rear than the seam 30).

Other Modified Examples

Although each of the above exemplary embodiments and each of the above modified examples are examples in which the present invention is applied to a driver seat or front passenger seat (seatback 14), the present invention is not limited thereto. For example, the present invention may be applied to a seat from the second row backward in a layout in which left and right seats (the seatbacks 14) are arranged separated in the vehicle width direction (a separate type layout). Moreover, the far side airbag device 10 etc. may, for example, be provided to both of mutually adjacent seats in the vehicle width direction (for example, the driver seat and the front passenger seat), or may be provided to only one thereof.

Moreover, each of the above exemplary embodiments and each of the above modified examples are examples equipped with a tension cloth serving as a tension member; however, the present invention is not limited thereto. For example, configuration may be made with a cord-shaped member provided as a tension member. The tension cloth of the present invention also includes tension cloth formed in a net (mesh) shape.

Moreover, each of the above exemplary embodiments and each of the above modified examples are examples in which the front inflation section 28 restrains (protects) the head of the seated occupant D; however, the present invention is not limited thereto. It is sufficient for the front inflation section 28 to configured to restrain the font portions of the chest and abdominal regions of the seated occupant D, and, for example, configuration may be made in which no portion is provided to restrain the head.

Moreover, although each of the above exemplary embodiments and each of the above modified examples are examples in which the present invention is applied to a far side airbag device, the present invention is not limited thereto. For example, the present invention may be applied to a side airbag device in which a side airbag inflates and deploys between a seatback and a vehicle structural portion (such as a side door) at the vehicle width direction outside thereof. In particular, in a convertible or the like not installed with a curtain airbag device, due to a large side airbag being employed to protect the seated occupant from a side-on collision and rollover, there is a susceptibility to potential damage to a seated occupant in an irregular seated posture from the side airbag being realized. Moreover, a side airbag at the outside of the vehicle seat in the vehicle width direction requires inflation and deployment to be completed in a side-on collision in a relatively short time compared to a far side airbag device. Thus even in a normal vehicle that is not a convertible, potential damage to the seated occupant by a side airbag that inflates and deploys quickly is susceptible to becoming an issue. Employing the present invention (tension cloth) to various such configurations contributes to a reduction in potential damage to a seated occupant from the side airbag.

Moreover, although each of the exemplary embodiments and modified examples described above illustrate examples in which the inflator 18 is actuated in a side-on collision of an automobile, the present invention is not limited thereto. For example, the inflator 18 may be actuated in a small overlap collision in which another vehicle collides with a vehicle width direction outside end portion of the inflatormounted-vehicle, or in an oblique collision in which another vehicle collides with the vehicle itself from at an angle from the front.

Although each of the above exemplary embodiments and modified examples described above illustrate examples in which the flow regulator cloth 22 is provided inside the side airbag 20, the present invention is not limited thereto. For example, configuration may be made without providing a flow regulator cloth.

Obviously various modifications may be implemented within a scope not departing from the spirit of the present invention. For example, the configuration (elements) of each of the above exemplary embodiments and modified examples may be appropriately combined or exchanged with each other.

The invention claimed is:

1. A side airbag device comprising:
a side airbag that is provided at a side portion of a seatback, and includes a rear inflation section that is adapted to inflate and deploy at the side of at least rear portions of the chest and abdominal regions of a seated occupant on receipt of supplied gas, and a front inflation section that is adapted to inflate and deploy at the side of at least front portions of the chest and abdominal regions of the seated occupant on receipt of gas supplied from the rear inflation section through a communication path formed at a boundary between the rear inflation section and the front inflation section; and
a tension member that receives tension and deploys accompanying inflation and deployment of the side airbag, wherein in a deployed state, a front end side of the tension member in the vehicle front-rear direction is connected to the rear inflation section, and the rear end side of the tension member in the vehicle front-rear direction is connected to a frame of the seatback, wherein:
the tension member includes an outside tension member that deploys to the outside of the rear inflation section in the seat width direction,
the boundary between the rear inflation section and the front inflation section is formed by a tether that extends in the seat width direction and partitions the side airbag into the rear inflation section and the front inflation section, and
the outside tension member covers only an upper portion of the rear inflation section.

2. The side airbag device of claim 1, wherein:
the rear inflation section, in an inflated and deployed state, includes a shoulder restraining section that projects out further forward than an inflated and deployed portion adapted to be positioned at the side of the rear portions of the chest and abdominal regions of the seated occupant to a position adapted to be at the side of the shoulder region of the seated occupant; and
in the inflated and deployed state of the rear inflation section, a front end side of the tension member is connected to a front end portion of the shoulder restraining section in the vehicle front-rear direction.

3. The side airbag device of claim 1, wherein the outside tension member has a peripheral length in plan view from the front end side to the rear end side that is the same length, or shorter than, a peripheral length from a fixing location of the rear inflation section to the frame to a connection location of the rear inflation section and the front end side of the outside tension member.

4. The side airbag device of claim 1, further comprising an inside tension member that deploys to the inside of the rear inflation section in the seat width direction.

5. The side airbag device of claim 1, further comprising an in-bag tension member including at least a portion that is a portion deploying inside the rear inflation section.

6. The side airbag device of claim 1, wherein at least one of the rear end side of the tension member and the side airbag is anchored to an anchor member that is fixed to the frame.

7. The side airbag device of claim 1, wherein the side airbag is provided at a side portion on the vehicle center side of the seatback in the vehicle width direction, and inflates and deploys to the vehicle center side of the seatback in the vehicle width direction.

* * * * *